Dec. 9, 1930.    R. E. CORNWELL    1,784,578
ROTARY ENGINE
Filed Jan. 4, 1928    4 Sheets-Sheet 1
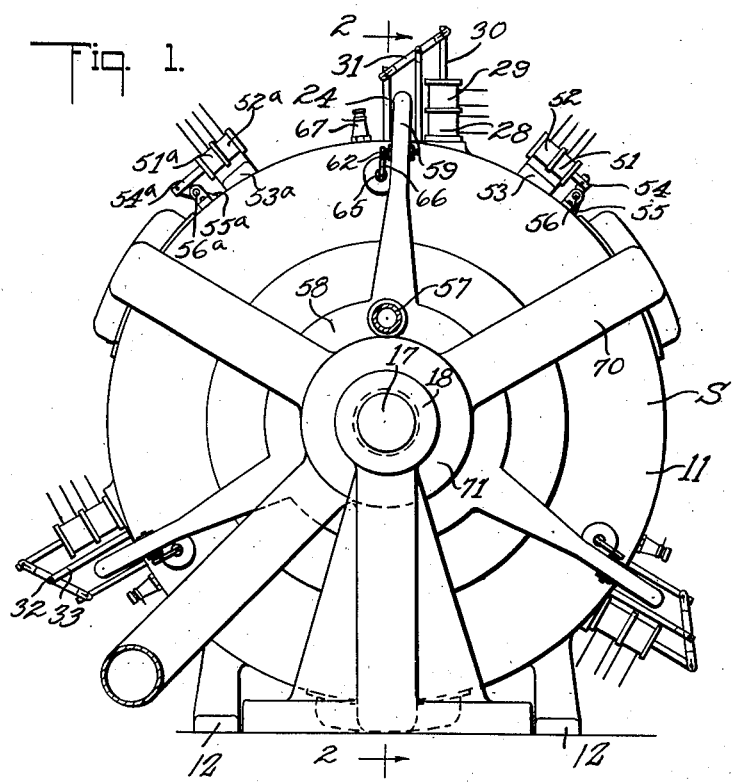
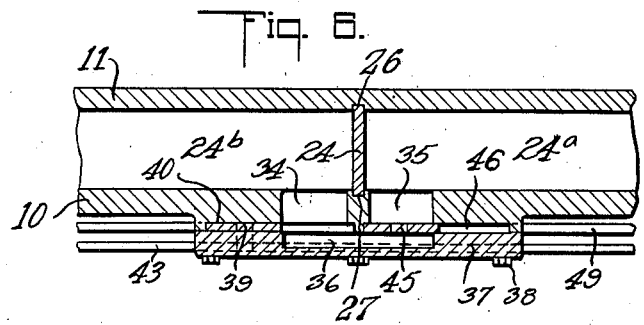
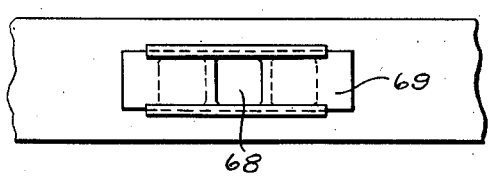
INVENTOR.
Ralph E. Cornwell;
BY Nunn & Co.
ATTORNEYS.

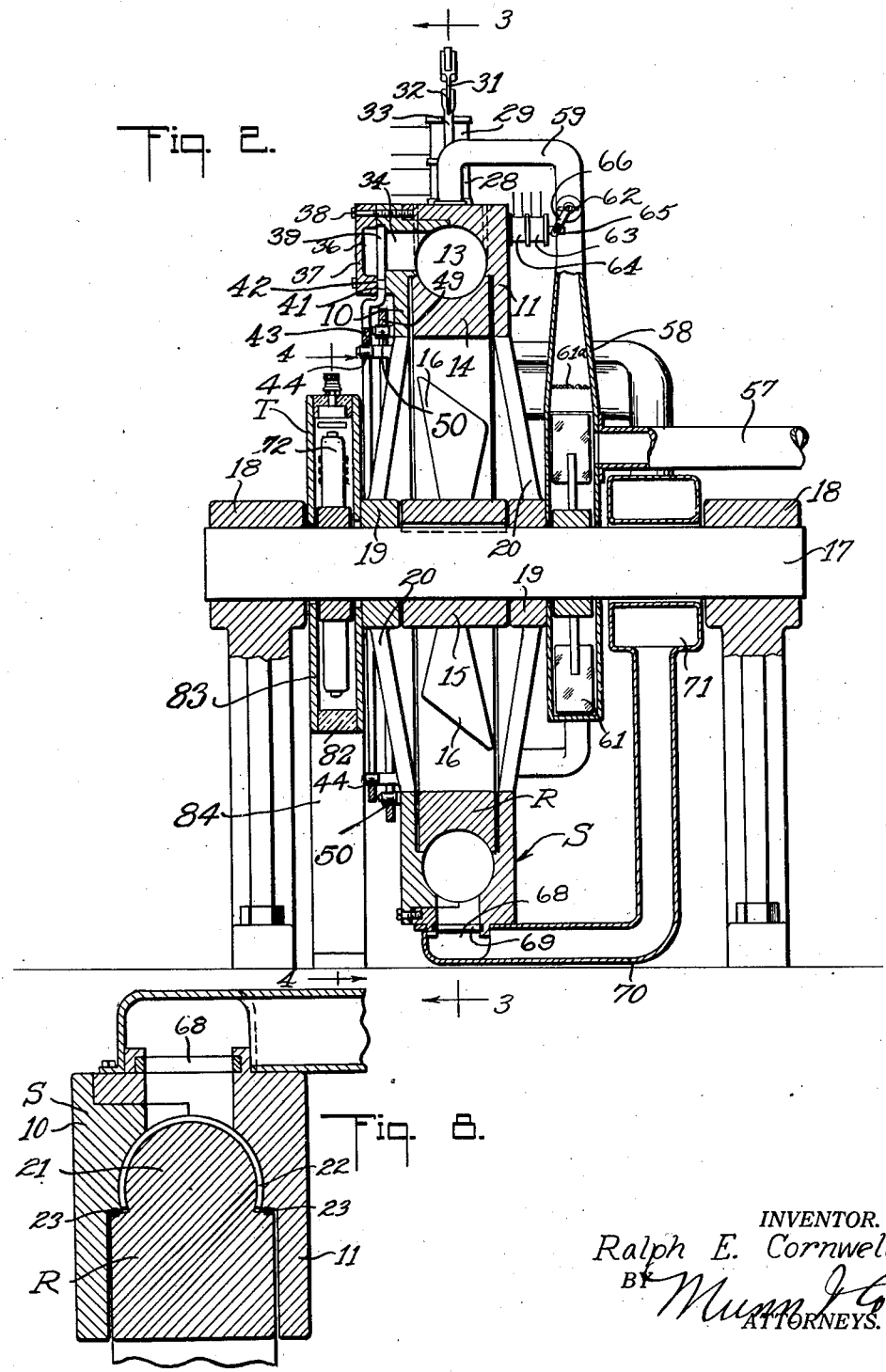

Dec. 9, 1930.                R. E. CORNWELL                1,784,578
                              ROTARY ENGINE
                          Filed Jan. 4, 1928        4 Sheets-Sheet 3

INVENTOR.
Ralph E. Cornwell;
BY
ATTORNEYS.

Dec. 9, 1930.   R. E. CORNWELL   1,784,578
ROTARY ENGINE
Filed Jan. 4, 1928   4 Sheets-Sheet 4
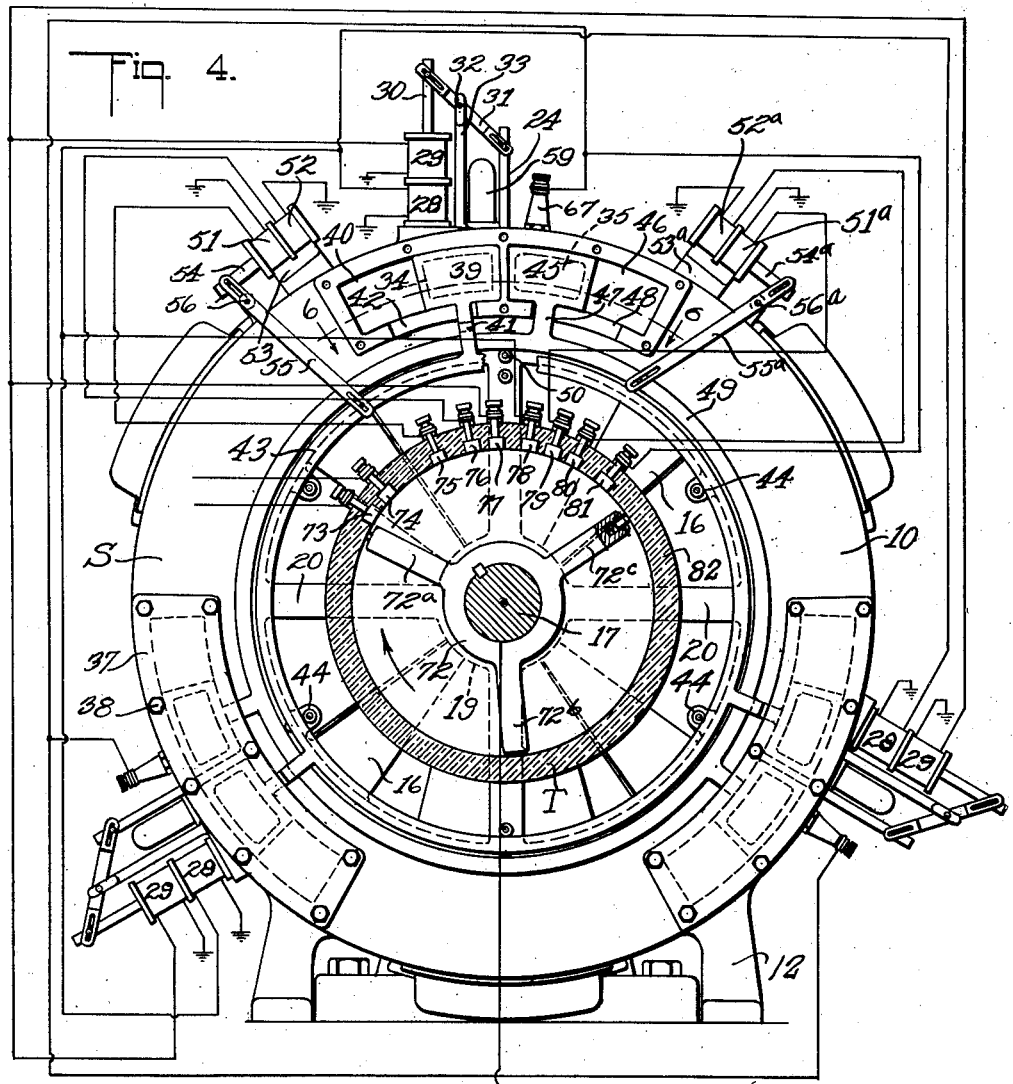
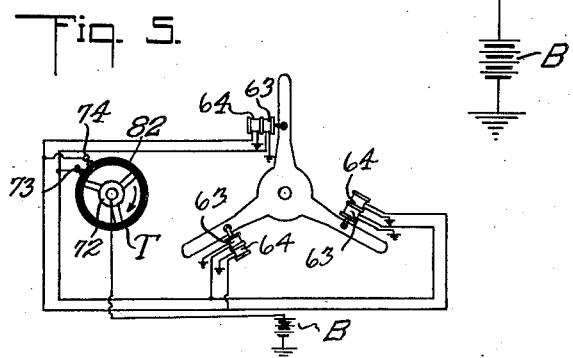
INVENTOR.
Ralph E. Cornwell;
BY Munn & G.
ATTORNEYS.

Patented Dec. 9, 1930

1,784,578

UNITED STATES PATENT OFFICE

RALPH E. CORNWELL, OF PASADENA, CALIFORNIA

ROTARY ENGINE

Application filed January 4, 1928. Serial No. 244,496.

My invention relates to and has for a purpose the provision of a rotary engine by means of which power impulses as derived from the expansion of the fuel being employed are caused to act against a rotor to effect rotation thereof and in a manner to obtain a maximum amount of power from a given quantity of fuel, to the end that an economical engine of high efficiency will be produced.

It is a further purpose of my invention to provide a rotary engine of the internal combustion type by which power impulses are adapted to be simultaneously delivered against the rotor at a plurality of respectively different points, which mode of operation is adapted to be repeated a predetermined number of times during each revolution of the rotor, to the end that a multiplicity of power impulses will be distributed over the rotor so that a practically continuous flow of power will result.

I will describe only one form of rotary engine embodying my invention and will then point out the novel features in the claim.

In the accompanying drawings,

Fig. 1 is a view showing in side elevation one form of rotary engine embodying my invention;

Fig. 2 is an enlarged vertical sectional view taken on the line 2—2 of Fig. 1 and looking in the direction of the arrows;

Fig. 3 is a sectional view taken on the line 3—3 of Fig. 2 and looking in the direction of the arrows;

Fig. 4 is a sectional view taken on the line 4—4 of Fig. 2 and looking in the direction of the arrows, the view also diagrammatically illustrating circuits for electrically operated valve actuating mechanisms embodied in my invention;

Fig. 5 is a diagram illustrating circuits for other electrically operated valve actuating mechanisms embodied in my invention;

Fig. 6 is a fragmentary sectional view taken on the line 6—6 of Fig. 4 and looking in the direction of the arrows;

Fig. 7 is a fragmentary view illustrating in elevation an exhaust valve embodied in my invention;

Fig. 8 is a fragmentary sectional view taken on the line 8—8 of Fig. 3 and looking in the direction of the arrows; and Fig. 9 is a fragmentary sectional view taken on the line 9—9 of Fig. 3 and looking in the direction of the arrows.

Referring specifically to the drawing in which similar reference characters designate similar parts in each of the several views, my invention in its present embodiment comprises a stator designated generally at S within which is mounted a rotor R, the stator being formed by a pair of interfitting annular sections 10 and 11, and the latter section being provided with feet 12 for supporting the stator as a unit in upright and elevated position as clearly shown in Fig. 1. The rotor R is received between the sections 10 and 11 and co-operates therewith to form an uninterrupted annular passage 13 of circular cross section between the stator and rotor as clearly shown in Figs. 2 and 3.

The rotor comprises a rim 14 and a hub 15 connected by radial webs 16 angularly disposed with respect to the plane of rotation of the rotor so as to function as fan blades for creating a circulation of air to effect cooling of the engine. The hub of the rotor is fixed upon a shaft 17 journaled in bearings 18, while each of the sections 10 and 11 are provided with hubs 19 connected to the sections by webs or spokes 20, the hubs freely receiving the shaft 17 so as to maintain the stator and rotor against relative disalignment.

The rim 14 of the rotor is provided with a plurality of pistons 21 in the present instance three in number and equally spaced circumferentially. The pistons 21 fit within the annular passage 13 so as to divide the latter into separate compartments and to travel therein during rotation of the rotor. The pistons are provided with sealing rings 22 to seal the confronting surfaces of the pistons and stator sections against the passage of fuel, while other sealing rings 23 (Fig. 8) are provided between the rotor and the stator sections.

The stator S is provided at equally spaced intervals circumferentially with a plurality of radially disposed abutments 24 of identical construction and in the present instance three in number and projecting through slots 25 formed in the periphery of the stator section 11, with their side edges slidable in grooves 26 and 27 formed in the stator sections 10 and 11 respectively, the inner ends of the abutments 24 being shaped to fit the cross-sectional contour of the periphery of the rotor rim 14.

The stator abutments 24 are adapted to be simultaneously moved from the position shown in full lines in Fig. 3 wherein they span the annular passage 13, to the position shown in broken lines in this figure wherein they clear the passage and permit passage of the pistons 21. The stator abutments co-operate with the pistons during rotation of the rotor to form compression chambers 24$^a$ in the passage 13 in advance of the pistons and combustion chambers 24$^b$ to the rear of the pistons. In the present instance the stator abutments 24 are electrically actuated and as the actuating means for the three abutments is identical a description of one will suffice for all. Each actuating means comprises a pair of solenoids 28 and 29 supported in end to end relation on the stator section 11 and having a single core 30 common to both solenoids, the outer end of the core having a pin and slot connection with one end of a lever 31 pivoted at 32 on a bracket 33 secured to the section 11, while the other end of the lever has a pin and slot connection with the outer end of a stator abutment 24. The solenoids when energized exert pulls in reverse directions on the core 30 so that the abutments will be positively moved to one or the other of its positions, and the manner in which the solenoids are energized will be hereinafter fully described.

At opposite sides of each of the three stator abutments 24, the stator section 10 is provided in its outer side wall with an outlet by-pass port 34 and an inlet by-pass port 35, the ports communicating with a by-pass chamber 36 formed in a housing or cover plate 37 secured to the stator by means of bolts 38 which extend freely through openings in the housing and the section 10 and are threaded into the section 11, thus serving to secure the sections together as well as securing the housing to the section 10.

The three ports 34 are controlled by valves 39 in the form of plates which are adapted to oscillate in arcuate pockets 40 formed in the housings 37, and are provided with extensions 41 which project through slots 42 for rigid connection to a ring 43 rotatably mounted on a plurality of rollers 44 journaled on the section 10 at circumferentially spaced intervals.

The three ports 35 are controlled by valves 45 also in the form of plates adapted to oscillate in arcuate pockets 46 formed in the section 10 beneath the housings 37 and provided with extensions 47 which project through slots 48 for rigid connection to a second ring 49 rotatably mounted on rollers 50 journaled on the section 10 at circumferentially spaced intervals.

In the present instance each of the rings 43 and 49 are adapted to be oscillated in one direction or another to cause their respective valves to open or close the respective ports 34 or 35, by an electrical actuating means, and as the actuating means for one ring is identical to that for the other, a description of one will suffice for both. To differentiate the reference characters of one actuating means from those of the other, the reference characters of one are provided with exponents.

The actuating means for the ring 43 comprises a pair of solenoids 51 and 52 supported in end to end relation on a bracket 53 secured to the stator section 11, and having a single core 54 common to both solenoids, the outer end of the core having a pin and slot connection with a lever 55 pivoted at 56 on the section 10 and the other end of the lever having a pin and slot connection with the ring 43, all of which is clearly shown in Fig. 4. The solenoids when energized exert pulls in reverse directions on the core 54 to oscillate the ring 43 in one direction or the other, and the manner in which the solenoids are energized will be hereinafter more fully described.

Gaseous fuel is adapted to be admitted to the compression chambers 24$^a$ from a pipe 57 leading from a source of supply under pressure (not shown) to an intake manifold 58 surrounding the shaft 17 and having branches 59 connected to intake ports 60 formed in the periphery of the stator section 11, there being three ports, one adjacent each stator abutment 24, as clearly shown in Fig. 3. To aid in forcing the fuel into the annular passage 13, a fan 61 is secured to the shaft 17 within the intake manifold 58, and to filter the fuel of foreign particles a screen 61$^a$ is secured in each of the branches 59.

Passage of fuel through the branches 59 to the intake ports 60 is controlled by butterfly valves 62 in the present instance adapted to be moved to open and close the branches by electrical actuating means comprising a pair of solenoids 63 and 64 for each of the valves, the solenoids being disposed in end to end relation and supported on the section 11. Each pair of solenoids 63 and 64 is provided with a single core 65 common to both solenoids and having a pin and slot connection with the free end of an arm 66 directly connected to a butterfly valve 62, to the end that the valve will be opened or closed according as one solenoid or the other is energized, and the manner in which the solenoids for each of the valves are energized will be hereinafter fully described.

Adjacent each stator abutment 24 and at the side of the abutment opposite the intake port 60 is a spark plug 67 adapted to fire a charge of fuel in a combustion chamber 24$^b$, while at points substantially medial between adjacent stator abutments, the stator section 11 is provided with exhaust ports 68 adjustable by means of slidable ported closure plates 69 so that the points at which burnt gases are exhausted from the annular passage 13 can be varied. The exhaust ports communicate with branches 70 of an exhaust manifold 71 so as to permit the gases to be conducted from the engine.

For energizing the solenoids 63, 64, 51, 52, 28, 29, 51ᵃ, and 52ᵃ and for firing the spark plug 67 at predetermined times, I provide a timer T comprising a contact member 72 secured to the shaft 17 for rotation therewith and having three contact arms 72ᵃ, 72ᵇ, and 72ᶜ adapted to successively wipe across a plurality of contacts, nine in number and bearing numerals 73, 74, 75, 76, 77, 78, 79, 80, and 81, the contacts being carried by a ring of insulating material 82 forming part of a stationary casing 83 for the contact member supported on a bracket 84 (Fig. 4).

From a consideration of Figs. 4 and 5, it will be seen that the contacts 73, 74, 75, 76, 77, 78, 79, 80, and 81 constitute one terminal of circuits of the respective solenoids 63, 64, 51, 52, 28, 29, 51ᵃ, spark plugs 67, and solenoids 52ᵃ, these circuits having one side thereof grounded. Each circuit includes a battery B having one side thereof grounded and the other side connected to the rotating contact member 72 so that the member constitutes the other terminal of the circuits. It will thus be clear that as a result of rotation of the contact member 72 the circuits will be successively closed to energize the solenoids and spark plugs in a predetermined sequence as will be more fully described in the operation of the engine which is as follows:

Let it be assumed that the rotation of the rotor R has been initiated in the direction of the arrows in Figs. 3, 4, and 5 by a conventional starting mechanism (not shown). With the rotor occupying the position shown in Fig. 3, the contact member 72 will occupy the position shown in Figs. 4 and 5; the three stator abutments 24 occupying the closed position shown in full lines in Fig. 3; the valves 39 and 45 closing the by-pass ports 34 and 35 respectively; and the inlet valves 62 occupying closed positions.

By reference to Figs. 4 and 5, it will be clear that upon continued rotation of the rotor R the contact arm 72ᵃ will successively engage the contacts 73 to 81 inclusive, first engaging the contact 73 to close the circuit including the three solenoids 63 to cause the latter to be simultaneously energized to open the three fuel inlet valves 62, thus permitting fuel from the manifold 58 to enter the intake ports 60 and fill the compression chambers 24ᵃ in advance of the pistons 21. The contact arm will next engage the contact 74 and close the circuit including the three solenoids 64 to cause the latter to be simultaneously energized to close the three fuel inlet valves 62, thus trapping charges of fuel in the compression chambers, which charges will be compressed upon continued rotation of the rotor. The contact arm will next engage the contact 75, thus closing the circuit including the solenoids 51 to cause the latter to be energized to actuate the ring 43 and open the three by-pass valves 39, thereby permitting the compressed charges of fuel to rush into the by-pass chambers 36 through the ports 34.

The contact 76 will next be engaged by the contact arm 72ᵃ at which time the pistons are starting their travel across the by-pass outlet ports 34. The circuit including the solenoid 52 will thus be closed to energize the solenoid and cause the ring 43 to be reversely actuated to close the three by-pass valves 39 thus trapping the compressed charges of fuel in the by-pass chambers 36.

As the pistons travel across the closed by-pass ports 34, the contact 77 will be engaged by the contact arm 72ᵃ to close the circuit including the three solenoids 28, thus simultaneously energizing the latter to cause the three stator abutments 24 to be moved to the position shown in broken lines in Fig. 3 in which they clear the annular passage 13 to permit the respective pistons 21 to pass, and immediately upon passage of the pistons the contact 78 is engaged to close the circuit including the three solenoids 29, thus simultaneously energizing them and causing the three stator abutments 24 to be reversely actuated and moved to closed position behind the respective pistons.

After the pistons have passed the respective inlet by-pass ports 35 the contact 79 is engaged by the contact arm 72ᵃ to close the circuit including the solenoid 51ᵃ, thus causing the ring 49 to be actuated to simultaneously open the three by-pass valves 45, thereby permitting the compressed charges of fuel previously trapped in the by-pass chambers 36 to rush into the combustion chambers 24ᵇ behind the respective pistons 21.

The contact 80 is next engaged by the contact arm 72ᵃ to close the circuit including the solenoid 52ᵃ, thus energizing the solenoid to reversely actuate the ring 49 and thereby restore the three by-pass valves 45 to closed position.

Immediately after the closing of the by-pass valves 45 the contact 81 is engaged by the contact arm 72ᵃ so that the circuit including the three spark plugs 67 is closed, thus igniting the charges of fuel in the combustion chambers and causing the ignited charges under their expansive action between the stator abutments 24 and the respective pistons 21 to force the rotor R to rotate in the direction indicated by the curved arrow in Fig. 3.

When the pistons have passed the respective exhaust ports 68, the burnt charges of fuel will be free to exhaust therethrough into the branches 70 of the exhaust manifold 71, and from the latter to atmosphere.

It will thus be clear that three power impulses are simultaneously delivered against the rotor at equally spaced points circumferentially and that, as three equally spaced contact arms 72$^a$, 72$^b$, and 72$^c$ are provided on the contact member 72, the cycle of operation above described will be effected three times for each revolution of the rotor so that at each 120° of travel of the rotor a power impulse will be delivered against each of the three pistons 21.

Although I have herein shown and described only one form of rotary engine embodying my invention, it is to be understood that various changes and modifications may be made therein without departing from the spirit of the invention and the spirit and scope of the appended claim.

I claim:

A rotary engine comprising a stator, a rotor in the stator co-operating therewith to provide an annular passage between the two and having a piston disposed in said passage, a second abutment in the stator mounted for movement to occupy one position in which it clears said passage to permit the passage of the piston, and another position in which it spans the passage so as to co-operate with the piston during rotation of the rotor to form a compression chamber in the passage in advance of the piston, said stator having an intake port through which fuel is adapted to be admitted to the compression chamber for compression by the piston when approaching the stator abutment, the stator having a by-pass chamber provided with ports, one of which communicates with the compression chamber and constitutes an inlet to permit the passage of compressed fuel from the compression chamber into the by-pass chamber, and the other of which communicates with the combustion chamber and constitutes an outlet to permit the discharge of fuel into the combustion chamber from the by-pass chamber, valves for controlling said ports, electro-magnetic means for actuating said stator abutment and valves in a predetermined sequence in timed relation to the movement of the rotor, and means for igniting fuel discharged from the by-pass chamber into the combustion chamber behind the piston to exert a power impulse against the latter and thereby effect rotation of the rotor, said actuating means for the inlet and outlet valves comprising a pair of rings mounted for rotation, and to one of which the inlet valves are fixed while to the other of which the outlet valves are fixed, and electro-magnetic means for oscillating the rings in one direction or the other to accordingly open or close the respective valves, the electro-magnetic means for opening and closing each valve comprising solenoids, arranged in end-to-end relation to each other and having a core in common.

RALPH E. CORNWELL.